(12) United States Patent
Vougioukas et al.

(10) Patent No.: US 10,729,167 B2
(45) Date of Patent: Aug. 4, 2020

(54) AUTOMATED STRAWBERRY ORIENTING AND CAPPING MACHINE

(71) Applicant: THE REGENTS OF THE UNIVERSITY OF CALIFORNIA, Oakland, CA (US)

(72) Inventors: Stavros Vougioukas, Davis, CA (US); David Slaughter, Davis, CA (US); Dennis Sadowski, Davis, CA (US); Long He, Richland, WA (US); Adrien Durand-Petiteville, Davis, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 306 days.

(21) Appl. No.: 15/867,589

(22) Filed: Jan. 10, 2018

(65) Prior Publication Data

US 2018/0199613 A1    Jul. 19, 2018

Related U.S. Application Data

(63) Continuation of application No. PCT/US2016/044275, filed on Jul. 27, 2016.
(Continued)

(51) Int. Cl.
*A23N 15/02* (2006.01)
*B26D 3/26* (2006.01)
(Continued)

(52) U.S. Cl.
CPC ............ *A23N 15/02* (2013.01); *A23N 15/04* (2013.01); *B26D 3/26* (2013.01); *B26D 5/007* (2013.01);
(Continued)

(58) Field of Classification Search
CPC ................... A23N 15/02; A23N 15/04; B26D 2007/0018; B26D 2210/02; B26D 3/26; B26D 5/007; B26D 7/0625
(Continued)

(56) References Cited

U.S. PATENT DOCUMENTS 2,323,668 A    7/1943   Morgan
3,092,160 A    6/1963   Hartman
(Continued)

FOREIGN PATENT DOCUMENTS

AU         857666 A      1/1968
EP         1632141   *   3/2006
(Continued)

OTHER PUBLICATIONS

European Patent Office (EPO), Communication (extended European search report) dated Feb. 13, 2019, related European patent application No. 16831294.0, pp. 1-6, claims searched, pp. 7-9.
(Continued)

*Primary Examiner* — Dana Ross
*Assistant Examiner* — Joseph W Iskra
(74) *Attorney, Agent, or Firm* — O'Banion & Ritchey; John P. O'Banion (57) ABSTRACT

An automated apparatus for removing the tops (calyx) of strawberries as they move along a conveyor belt having a plurality of concave-shaped slotted rollers which operate to orient the calyx of each strawberry for being cut. Images are captured and processed for locating the calyx of each strawberry and determining an optimal cutting plane. In response to the image processing a control system actuates a blade in a cutting apparatus to pass through the produce item and into one of the slots in a roller, or rollers, to separate the calyx from the body of the strawberry.

14 Claims, 9 Drawing Sheets

Related U.S. Application Data (60) Provisional application No. 62/198,221, filed on Jul. 29, 2015.

(51) Int. Cl.
    *A23N 15/04*     (2006.01)
    *B26D 5/00*     (2006.01)
    *B26D 7/06*     (2006.01)
    *B26D 7/00*     (2006.01)

(52) U.S. Cl.
    CPC .... *B26D 7/0625* (2013.01); *B26D 2007/0018* (2013.01); *B26D 2210/02* (2013.01)

(58) Field of Classification Search
    USPC .......................................................... 99/489
    See application file for complete search history.

(56) References Cited

U.S. PATENT DOCUMENTS

| | | | |
|---|---|---|---|
| 3,952,646 A | 4/1976 | Leban | |
| 3,978,237 A * | 8/1976 | Minera | A23N 15/02 426/481 |
| 5,590,591 A | 1/1997 | Kim | |
| 5,855,270 A | 1/1999 | Throop | |
| 9,364,020 B2 | 6/2016 | Tao | |
| 2014/0272055 A1* | 9/2014 | Tao | A23N 15/02 426/484 |
| 2016/0157428 A1 | 6/2016 | Pitzer | |
| 2016/0157429 A1 | 6/2016 | Pitzer | |
| 2016/0157430 A1 | 6/2016 | Pitzer | |
| 2016/0157431 A1 | 6/2016 | Pitzer | |
| 2016/0161238 A1 | 6/2016 | Pitzer | |
| 2016/0255873 A1 | 9/2016 | Tao | |

FOREIGN PATENT DOCUMENTS

| | | | |
|---|---|---|---|
| EP | 1632141 A1 | | 3/2006 |
| EP | 2923586 | * | 9/2015 |
| EP | 2923586 A1 | | 9/2015 |
| KR | 2019970001162 Y1 | | 2/1997 |
| WO | 0213635 A1 | | 2/2002 |
| WO | 2011055733 A1 | | 5/2011 |
| WO | 2014144268 A1 | | 9/2014 |

OTHER PUBLICATIONS

Korean Intellectual Property Office (KIPO), International Search Report and Written Opinion dated Oct. 27, 2016, related PCT international application No. PCT/US2016/044275, pp. 1-15, with claims searched, pp. 16-20.

Dooley, J. H. et al., "Orienting and Capping of Strawberries for Processing", ASAE Electric Power and Processing Dvision, ASAE Paper No. 72-833, Mar. 1974, pp. 945-948.

Dooley, James Henry, "Orientation of Strawberries for Mechanical Capping", California State Polytechnic College, Dec. 1972, pp. 1-46.

Oregon Horticultural Society, Sixty-First Annual Report, Eighty-Fourth Annual Meeting, vol. 61, Salem, Oregon, Jan. 28-30, 1970, pp. 126-129.

Oregon Horticultural Society, Sixtieth Annual Report, Eighty-Third Annual Meeting, vol. 60, Corvallis, Oregon, Nov. 20-22, 1968, pp. 95-101.

McCarty, Ivon E. et al., "Hand and Machine Capping of Strawberries", Bulletin, University of Tennessee, Agricultural Experiment Station, 1960, pp. 5-39, 43-45.

California Strawberry Commission, "Annual Prduction Research Report 2012-2013", 2014, pp. 1-212.

* cited by examiner

AUTOMATED STRAWBERRY ORIENTING AND CAPPING MACHINE

CROSS-REFERENCE TO RELATED APPLICATIONS

This application is a 35 U.S.C. § 111(a) continuation of PCT international application number PCT/US2016/044275 filed on Jul. 27, 2016, incorporated herein by reference in its entirety, which claims priority to, and the benefit of, U.S. provisional patent application Ser. No. 62/198,221 filed on Jul. 29, 2015, incorporated herein by reference in its entirety. Priority is claimed to each of the foregoing applications.

The above-referenced PCT international application was published as PCT International Publication No. WO 2017/019775 on Feb. 2, 2017, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to processing of fruit, and more particularly to automated machinery for the orienting and capping of strawberries.

2. Background Discussion

Over a half billion pounds of capped strawberries are used by the strawberry processing industry each year in the United States. Numerous attempts have been made to develop mechanical strawberry capping machines during the past seventy years, and no completely automated machine has been sufficiently successful as to be commercially viable. The current state of the art is that strawberries are still capped in the field by pickers with blades, just as was done a hundred years ago. Not only is this extremely labor intensive, but it is also dangerous and unsanitary. Workers risk cutting their fingers, fruit is wasted due to inconsistent cuts, and strawberries begin to degrade immediately upon being cut, so by the time the capped berries reach the processing plant a significant portion are not suitable for use.

Machinery developed to handle other types of fruit do not work well with strawberries because of their fragility and unique shape. In addition, because there are fewer workers willing to pick and cap strawberries in the field, or to work in processing plants because of the seasonal nature of the industry, there is great demand from the processors for automation to replace this labor-intensive and costly procedure.

Although designs have been developed for portions of the strawberry capping task, none of the designs have been successful in integrating all of the required tasks to complete the capping process. Some failed designs were too aggressive with the fragile strawberries, others required device-to-device transfers during the process, in which orientation of the strawberry is lost.

Accordingly, a need exists for an improved mechanism for capping produce items. The present disclosure fulfills that need and provides additional benefits.

BRIEF SUMMARY

The technology described in this disclosure is an automated capping system that allows strawberries to be oriented and then cut at a high speed using a unique roller/conveyor system and computer vision. The present disclosure provides for obtaining strawberry orientation and capping in the same carrier, without a device-to-device transfer step. In addition, the strawberries are not mechanically grasped which causes damage to the fruit. Even in the capping phase the presently disclosed system does not mechanically grasp the strawberries.

Strawberries are loaded onto a conveyor belt which has a series of adjacent concave slotted rollers. The fruit nestles between adjacent rollers which rotate in a first portion of the conveyor to cause the strawberries to align their long axis with that of the rotating roller. In a second portion of the conveyor, the rollers stop rotating, and hereafter maintain the fruit in its specific orientation. An imaging system is utilized to determine which way the strawberry faces and its position on the roller in relation to the underlying slots. The image information is utilized to determine if the berry should be cut and where along its long axis. A blade assembly is directed to make a cut which lines up with one of the slots on the roller so that the blade can fully cut through the strawberry without striking the roller. The apparatus can be configured for processing other forms of produce for which a similar orientation and capping operation is needed.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only.

DETAILED DESCRIPTION

1. Introduction

An apparatus and method for high-speed processing of strawberries, including orienting of the strawberries and removal of the calyx (capping) by cutting off the top of the strawberry. The apparatus is particularly well-suited for use in the strawberry processing industry where large quantities of capped strawberries are needed for jams, fillings, yogurt, ice cream, and many other food service applications. In one embodiment, orienting of the strawberries prior to cutting is achieved by using an array of uniquely-shaped concave rollers which spin as they travel along on the first part of a conveyor system. The shape of the rollers and the spinning motion cause the strawberries to tumble and rotate until they settle into a low-energy pose on their sides and are oriented with the long axis of the strawberry parallel to the axis of the rollers. Additionally, the rollers have a series of circumferential slots cut into the concave face of the roller and perpendicular to its axis of rotation. These slots allow a multi-blade cutting system to cap the strawberry (cutting away the calyx) while the strawberry is supported by the rollers, regardless of the lateral position of the strawberry along the roller axis.

A control system utilizing imagers and image processing controls the operation of the produce cutting head. The general steps of this control process include the following. A high-speed computer vision system obtains image information about each strawberry to determine if the strawberry is in a suitable pose to be cut. Additionally, the process determines which slot in the roller is closest to the ideal cutting line to remove the calyx while minimizing the amount of fruit lost in the cap.

A conveyor system carries the rollers holding the berries to a cutting head (station) where actuated blades are assigned to each slot in the rollers. The computer sends a signal to the blade above the "ideal" slot and the rapidly descending blade cleaves the cap from the strawberry. As the conveyor reaches the end and loops around, the cut strawberry and cap fall from the rollers onto a grating which separates the caps from the berries. Strawberries which had not attained a proper pose for cutting are either ejected from the conveyor, or pass by the blades uncut (controller does not actuate cutting) and are then diverted from the flow of cut strawberries from the exit end of the conveyor. Those berries may be either fed back into the system for another pass or may be sent directly to a separate line, such as to be juiced.

The concave spinning roller system utilized according to the present disclosure has beneficial structures, beyond that of fruit-sorting, as described below. (1) The rollers are configured with slotting which interoperates with, (2) individually actuated high-speed blades in a multi-blade cutting station. Control and accuracy are provided by, (3) a vision system in combination with control processing which determines if the strawberry should be cut, and if so, to select the blade from the multi-blade set that could perform the optimum cut resulting in (4) strawberries that are automatically oriented and capped in this single apparatus.

2. Strawberry Orienting and Cutting Embodiment

Figure 1A:
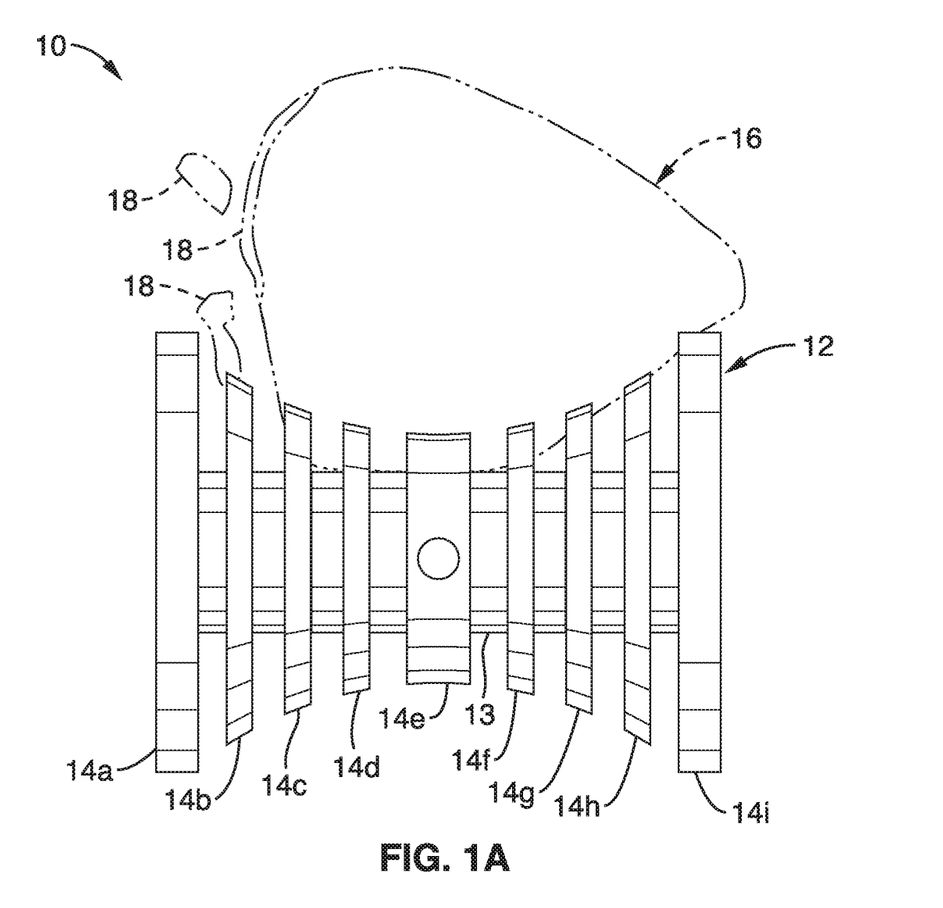
FIG. 1A and FIG. 1B are views of slotted concave rollers utilized according to an embodiment of the present disclosure.
Figure 1B:
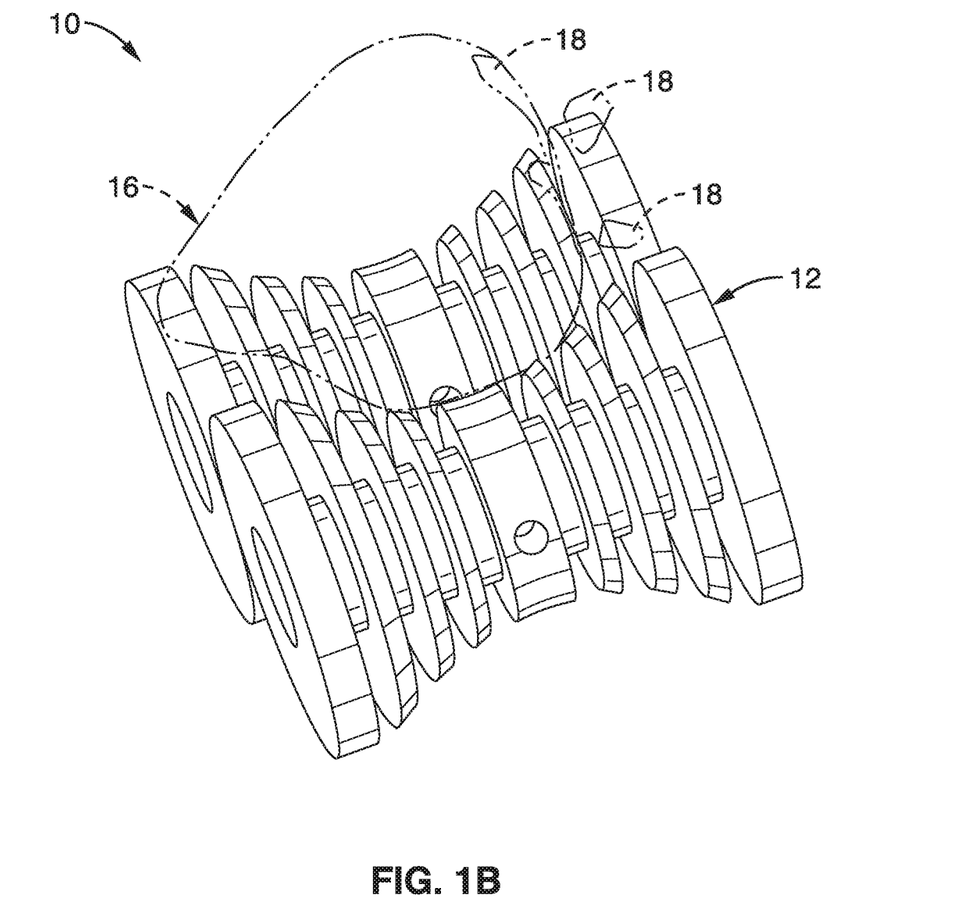

FIG. 1A and FIG. 1B illustrate an example embodiment 10 of a strawberry 16 engaged between adjacent concave slotted rollers 12. In FIG. 1A rollers 12 are seen in a facing view, with a second roller largely hidden behind the front roller. In FIG. 1B a 3D view is seen of strawberry 16 nestled between two rollers 12. Each roller 12 is seen comprising a plurality of parallel plates 14a to 14i, with a gap between each pair of these parallel plates which are coupled to a spine. The parallel plates are shown in this example embodiment as extending from an axial core 13 (axial spine) of the roller. These rollers can be readily fabricated by a molding operation, or by turning operations, or a combination thereof.

Strawberry 16 is retained on the rollers allowing the top 18 (calyx) of strawberry 16 to be severed by a cutter that extends down into the gap between any pair of these parallel plates, thus assuring fully cutting through the head of the strawberry without striking the rollers (which could not only damage the rollers but could contaminate the produce).

The space between adjacent concave slotted rollers form a sort of "cradle" which mimics the typical conical shape of a strawberry. A strawberry deposited into this cradle may or may not land on its side. However, by spinning the rollers in the same direction, the strawberry will rotate several times and with a high probability settle into a stable pose on its side with its long axis perpendicular to the slots in the rollers (e.g., long axis of the strawberry parallel to the axis of rotation of the roller). In addition, because of the concave shape of the rollers, the pose of the strawberry will be such that a vertical blade passing through the strawberry will be perpendicular to the long axis of the strawberry, resulting in a clean, non-skewed cut.

Figure 2:
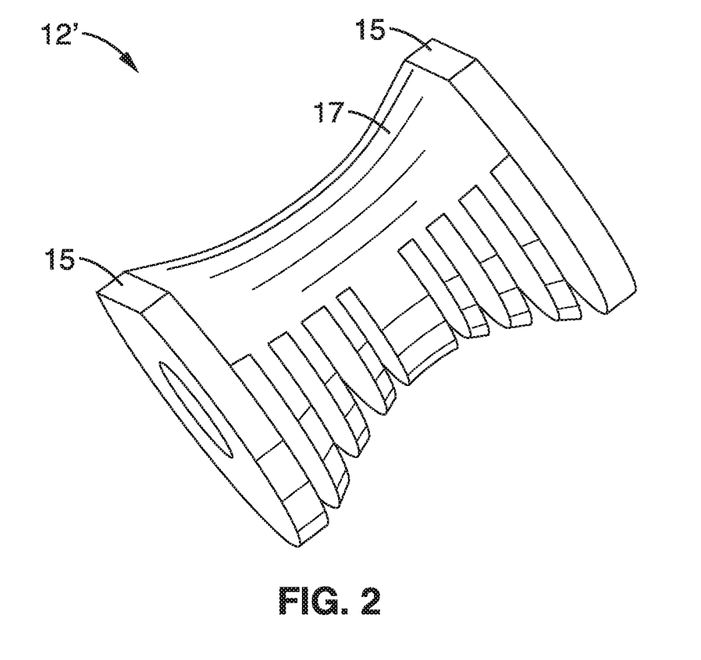
FIG. 2 is a view of slotted concave rollers having alignment flats according to another embodiment of the present disclosure.
Figure 3:
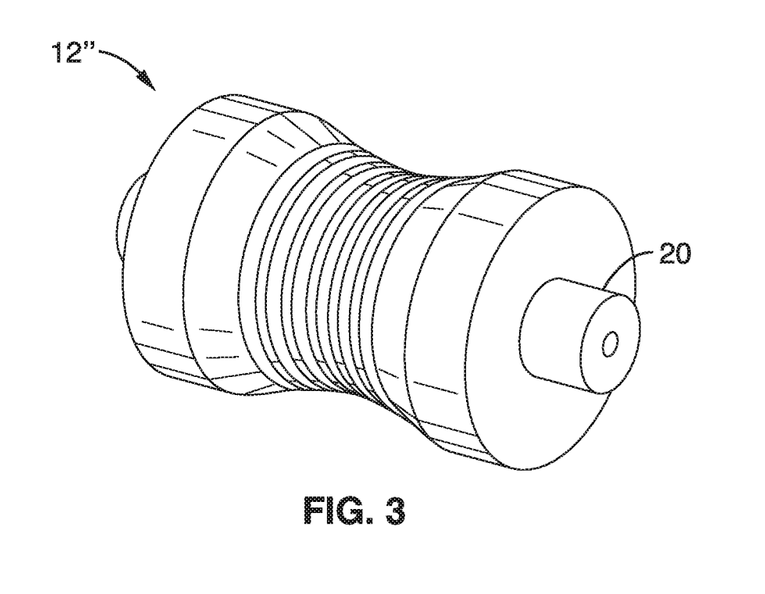
FIG. 3 is a view of slotted concave rollers having friction pad protrusions according to another embodiment of the present disclosure.

FIG. 2 illustrates a roller embodiment 12', in which the outside plates are configured with flats 15 comprising chords cut/removed from the perimeters of these outside disks. In at least one embodiment, these flats are configured for engaging a rail system (35 in FIG. 3B) to lock the rollers into a specific orientation during the imaging process and calyx cutting. This embodiment of rollers is also depicted using a non-axial spine 17 for conjoining all parallel plates into a single roller unit. These rollers, for example, are fabricated with slots extending down to a solid section (spine) at the bottom of the roller, having flats cut into its exterior plates. Use of this embodiment can allow for an increased depth of cut, because if stub axles are provided (only engage each end of the roller and not through the center of the roller), then the cutter can extend more than half the depth of the roller, thus simplifying cutter operation. It should also be appreciated that other roller designs may be configured with the flats, while the non-axial spine element may be utilized with rollers which are not configured with spines.

FIG. 3 illustrates another roller embodiment 12'', having a friction pad projection 20 for engaging a rack to generate rotation on the roller.

Figure 4A:
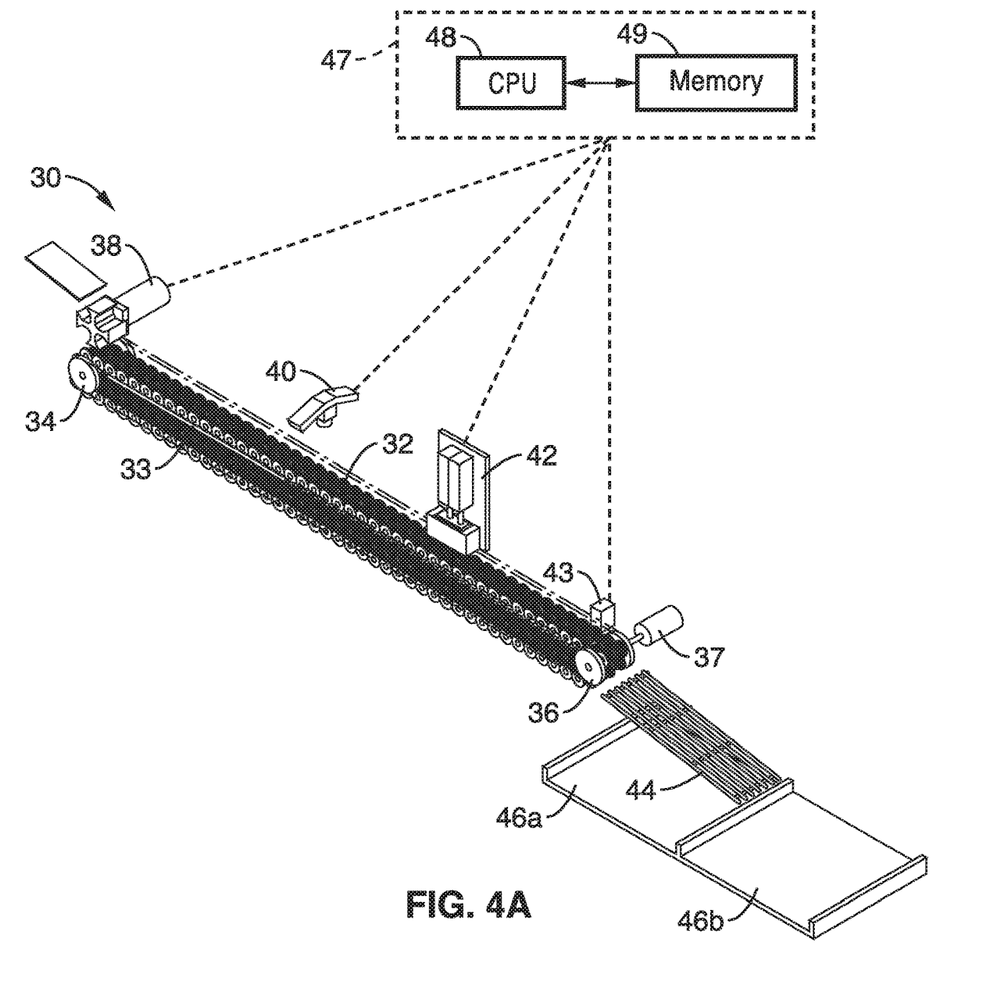
FIG. 4A and FIG. 4B are views of an automated strawberry orienting and capping system according to an embodiment of the present disclosure.
Figure 4B:
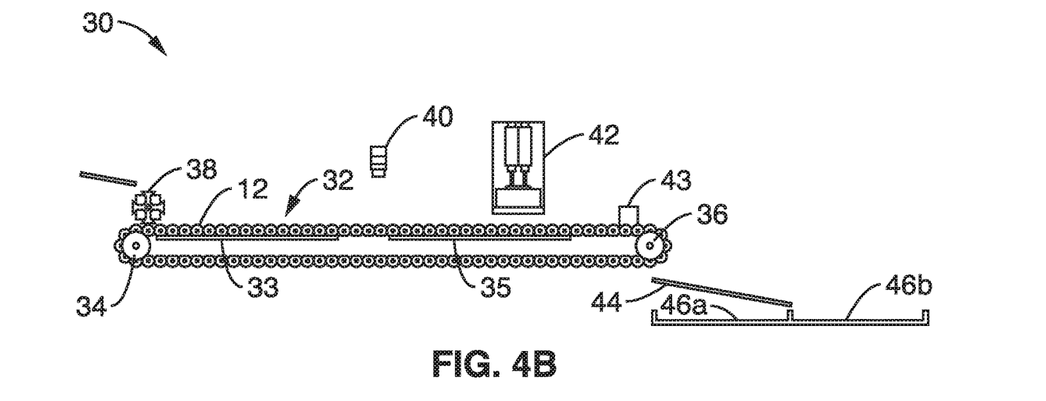

FIG. 4A and FIG. 4B illustrate an example embodiment 30 of a conveyor system having a belt 32, which retains a plurality of parallel rollers 12 in a transverse orientation to the length of the belt. Belt 32 is seen engaged between a first sprocket 34 and a second sprocket 36. At least one of the sprockets is coupled to a conveyor drive motor 37 which allows turning the conveyor on and off and preferably optimizing the speed of conveyor operation. The underside of the rollers along at least a portion of conveyor belt 32 are preferably in contact with a friction pad 33 which induces rotation of rollers 12. An optional rail system 35 is shown for locking rollers, such as roller 12' seen in FIG. 2, into a specific rotational position. Although a conveyor belt is described above having a single row of rollers, it should be appreciated that the conveyor may be widened to any practical width for retaining multiple rows of rollers, with the system including additional singulators, imagers, cutting heads and diverters to accommodate the number of rows utilized.

A combination feed chute and/or singulator 38 is seen for directing strawberries which are separated one-by-one onto rollers 12 of belt 32, thus preventing clumping of multiple strawberries on any one portion of the conveyor belt. Alternate mechanisms for loading the strawberries onto the rollers may be utilized without limitation, such as catching the strawberries onto the roller system from a water bath, or similar.

An imaging system 40, such as comprising one or more imagers (e.g., cameras) and associated lighting, is depicted for capturing still and/or video images of the strawberries as they move on the roller system toward at least one blade assembly 42 configured for cutting the tops from the strawberries as they pass along the conveyor. In at least one embodiment, detectors, and/or additional imagers, are retained off the exit end of the conveyor, or at other portions of the system as desired to facilitate control and monitoring of the food processing operation and equipment status.

The system preferably includes a diverter (or ejector) 43, which is configured for diverting (ejecting) uncut strawberries along a first path, while the cut strawberries continue along the conveyor path, or exit off the end of the conveyor path. A separator grate 44 off the exit end of the conveyor is configured for retaining the cut strawberries above the grating 44 directed toward a collection area 46b, while the cut strawberry tops fall through the grating into bin 46a.

Blade assembly 42 may be configured in a number of different ways, insofar as the cutting blade is retained for moving down through the strawberry into the gap between parallel plates of a roller. It will be appreciated that multiple cutters may be positioned, such as one cutter for each slot between the plates of the roller, so that the cutter only need a single axis of motion downward to make a cut, thus facilitating conveyor speed. Alternatively, a single cutter can be utilized with a positioning system that allows it to be positioned over a desired roller slot, so that the cutter can be extended to cut the strawberry as it passes under the cutting head.

Although each cutter may comprise a single knife edge cutting head, the present disclosure may be utilized with other forms of cutter, such as sonic cutting blades, rotating cutting blades, or even beam style cutting (e.g., water jet, laser beam, air jet, or similar). Although the movement of the cutting heads in the blade assembly may be driven by any desired drive mechanism, it is typically performed utilizing electrical or pneumatic actuators whose actuation is determined by the control system.

In FIG. 4A a control system 47 is shown, such as comprising one or more computer processors 48 and one or more memories 49, without limitation except that these do not comprise a transitory signal. It should be appreciated that system control may be distributed, for example one or more of the modules (e.g., singulator 38, imager 40, cutting head 42, and/or diverter 43) may contain local processing capability to control operations and/or facilitate communication with a remote controller. In addition, control system 47 would typically generate outputs to a higher level control system, such as a plant control and monitoring system.

It should be appreciated that the conveyor mechanism may be constructed using a number of different belt configurations and materials without limitation, as will be recognized by one of ordinary skill in the art. By way of example and not limitation the belt may comprise two drive chains between which rollers are retained on axles that pass through the rollers for retention on each end by the drive chain. The drive chains are engaged on at least the two ends of the conveyor system by toothed sprockets retained on a shaft, each end of which engages a bearing, such as a pillow block. It should be recognized that a commercial operation may utilize multiple conveyor lines to increase processing speed. In addition, some of these conveyors may contain different sized rollers depending on the size of the strawberries being directed to this conveyor line.

The shafts coupling at least one pair of the sprockets are coupled a gearbox/motor assembly which drives the shaft, causing the sprockets to rotate and move the chain and attached rollers. Because the sprockets are keyed to common shafts, individual links of the opposing drive chains remain parallel to each other and travel at the same speed. Since the rollers are attached to the links of the drive chains with an axle they also move in a uniform motion with the chains. The speed and direction with which the chains move is controlled, such as by a variable frequency drive, or other drive speed control mechanism as desired.

The rollers mounted on this chain conveyor provide an endless loop of moving cradles which can pick up strawberries from a feeder mechanism, spin them to cause the berries to orient themselves into a proper "head sideways" pose, and carry the strawberries past a computer vision system to a cutting station where they are capped and finally drop the cut strawberry and cap onto a grating to separate the caps from the cut berries.

3. Operation of Strawberry Orienting and Cutting

In one embodiment, the apparatus may operate as described below. A crate of freshly picked strawberries is unloaded onto an inclined vibrating grate where debris, such as loose leaves, twigs, and dirt, fall through the grate and the berries roll down to a set of size-sorting grates. Through the use of chutes or conveyors, strawberries are sized and sent to the appropriately-sized roller lines. A singulating mechanism loads strawberries, ostensibly one-by-one, onto each passing pair of spinning rollers (in the niche between a pair of rollers). The rollers, which are being pulled along by the conveyor belt, can be made to spin by contact between the underside of the rollers and a friction plate or cam, or other mechanism. Testing of this mechanism has shown that strawberries placed in random orientations between these spinning rollers usually achieve a stable, horizontally aligned pose within about 2 to 5 seconds if the rollers are spinning at 3 to 4 revolutions per second. The period during which a strawberry will be spun depends upon the speed of the conveyor and the length of the friction pad. When the rollers lose contact with the friction pad they will stop spinning and the strawberry will remain in its pose.

Next, a computer-controlled imaging system (camera) obtains an image of the passing strawberry. The imaging software processes the image (snapshot) to determine the precise position and orientation of the strawberry within the cradle, the exact location of the calyx in relation to the underlying roller, and the ideal cutting plane needed to remove the calyx with minimal waste. All this is accomplished within milliseconds by processing steps performed by the control system. The cradled strawberry is then carried to the multi-blade cutting station where there is preferably one blade configured to engage each of the slots in the pair of rollers. The computer determines which slot/blade is closest to the idealized cutting plane and sends a signal to actuate that blade as the strawberry passes beneath it. The blade, which can be driven by a pneumatic piston or electromagnetic actuator, descends and retracts quickly (e.g., within a fraction of a second) to cleave the cap from the strawberry. To ensure a complete cut, the blade passes through the strawberry and enters the slot in the roller. A hard stop within the actuator limits the travel of the blade so that it goes into the slot but does not make contact with the axle of the roller. After the cutting station the rollers reach the turn around point of the conveyor. As the rollers travel down and around the end, the strawberry and cap fall onto a separation grate which catches the strawberry but allows the cap to pass through the grate. Caps and berries are then sent separately to be washed. (Washing could take place at the beginning of the process as desired.) Caps will most likely be sent to the juicing line while the cut strawberry may be individually quick frozen or perhaps sliced, depending upon the needs of the processor.

If the control system determines that the strawberry is not in a proper pose to be cut, then no signal is sent to the blade and the strawberry passes the cutting station uncut. However, a signal is sent to a diverter at the end of the line which will divert that strawberry to another conveyor which will carry the berry either back to be fed into the system again or perhaps sent to the juicing line, as desired depending upon the needs of the processor.

It is estimated based upon preliminary tests that each single row conveyor line should be able to cap between about 4 and 8 strawberries per second, though this rate may increase through the optimization of the various components and software. A large processing plant may run about 20 or more lines so that the throughput could be many scores of berries per second.

In the orientation section of the apparatus, a friction pad is mounted beneath the rollers, making contact with the underside of some cylindrical portion of the rollers. The friction pad for example, can be configured on rails (33 in FIG. 4A) which engage cylindrical friction pad projections 20 extending from the roller embodiment seen in FIG. 3. It should be appreciated that these projections could be knurled or even have teeth to engage a ribbed friction pad to guarantee that the rollers will always rotate. The forward motion of the rollers and retarding force of the friction pad causes the rollers to spin when they are in contact with the friction pad. If a strawberry is placed in a random orientation between a pair of adjacent spinning rollers, the friction between the strawberry and the rollers will cause the strawberry to rotate. Due to the unique shape of strawberries and the concave shape of the rollers, the strawberry will, with a high degree of probability, tend to settle into a low energy state with its long axis parallel to the long axis of the rollers.

In at least one embodiment, after leaving the orientation section, the outer edges of the rollers (seen as rollers 12' in FIG. 2) make contact with a pair of alignment bars (seen as rails 35 in FIG. 4B) located beneath the rollers. Friction between the alignment bars and the rollers causes the rollers to rotate until the flat sections of the roller are parallel to the alignment bars. At this point the rollers will no longer rotate but will maintain the same orientation. Since the flats on the rollers are parallel to the bottom of the slots on the rollers, this ensures that the slots will remain on the top side of the roller, so that an increased depth of cut is allowed.

An imaging device (camera) mounted above the conveyor captures an image of the strawberry resting between a pair of rollers as it passes by. The image is sent to a control system computer which utilizes image processing to rapidly locate the calyx on the strawberry and determine if the strawberry is in a good resting pose to be cut. If the strawberry is in a proper pose to be cut, the software determines the optimal cutting plane to remove the calyx with minimal loss of fruit flesh. It then determines which slot on the rollers is closest to the optimal cutting plane. A cutting blade is assigned to each slot, and the computer sends a signal to a programmable logic controller (PLC) which activates the appropriate blade when the strawberry passes beneath it.

In at least one embodiment, the cutting section of the apparatus consists of a series of blades mounted on pistons of high speed double acting pneumatic cylinders. There is a piston and blade assembly mounted above each slot on the rollers. Each blade passes through a thin slot on a blade guide to ensure that it remains in the same plane as the slot on the roller. Each pneumatic cylinder is activated by its own electronically controlled quick acting valve. A signal from the controller (programmable logic controller (PLC)) causes a valve to open which in turn causes the piston to rapidly extend, forcing the blade through the strawberry and into the underlying slot. A second signal causes the valve to reverse and rapidly retract the piston and blade.

Upon leaving the cutting section the cut strawberry and the cap with the calyx fall off the end of the conveyor and land on an inclined concave separation grate. The spacing of the grate is such that the cut strawberry will roll and/or slide down it, but the cap with the calyx will pass through the grate. The grate may be vibrated or sprayed with water or air to cause the cap to more easily fall through. The cut strawberries are sent to another line for further processing such as individual quick freezing, slicing, dicing, etc., while the caps may be collected and used for juicing.

If the strawberry is not in a proper cutting pose, the control system allows the strawberry to pass through the cutting section uncut. For example, the control system activates a diverter which diverts the uncut strawberry away from the separation grate to a chute or conveyor. This strawberry could be cycled back into the feeding mechanism to have another pass at orientation and cutting, or it could be sent directly to the juicing line depending upon the needs of the processor.

By way of example and not limitation, the diverter may comprise an angled chute mounted on a fast acting actuator (e.g., electrical or pneumatic piston). Just before an uncut strawberry falls off the end of the conveyor, the controller actuates the diverter into position, such as just above the separation grate to prevent the falling strawberry from landing on the grate. The diverter then retracts to allow cut strawberries to reach the grate.

It will be noted that in a conveyor system having multiple rows of rollers on a single conveyor, it is preferable that all operations (e.g., singulation, imaging, cutting, ejection diversion), be arranged above the roller belts. In the case of the ejector/diverter this may be performed in a number of ways, including for example using a vacuum path lowered over the roller as the berry approaches and opened at the proper time to draw the berry into a diversion path. It should also be appreciated that adjacent lines may be staggered to provide room to each side when using sideward ejectors/diverters.

4. Details of Process Control Steps

Programming executable on the control processor makes decisions based on imaging and other status information from the conveyor system, which determine the timing of the cutting, diverting, and other operations in the system.

Figure 5:
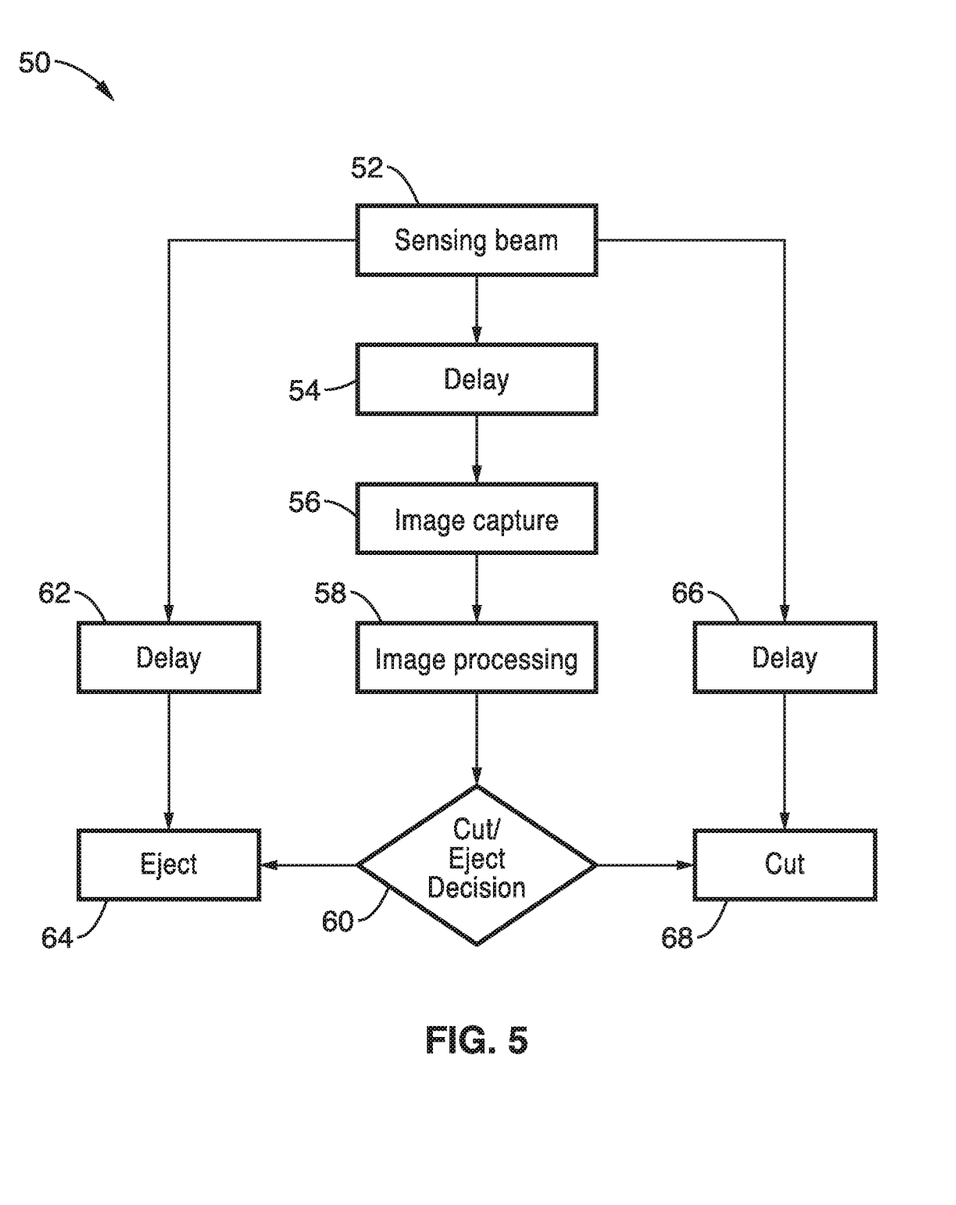
FIG. 5 is a flow diagram of an automated strawberry orienting and capping process utilized according to an embodiment of the present disclosure.

FIG. 5 illustrates an example embodiment 50 of process steps which are initiated when a roller pair cradling a strawberry breaks a sensing beam 52 (e.g., laser or infrared sensing beam). After breaking the beam there is a delay 54 dependent upon the speed of the conveyor to allow time for the rollers to reach the imager. Upon reaching the imaging system, at least one image of the roller pair is captured 56 and the image is processed 58. After the image is processed, a decision 60 is made based on that image(s) as to what to do with the strawberry which is on that roller pair. If the strawberry is determined to be in a proper cutting pose (orientation and position), then execution moves to cut 68 the strawberry, otherwise execution moves for ejection 64 of the strawberry. It should be noted that the strawberry is not cut if it is in an improper cutting pose, or if due to the position of the calyx too much fruit flesh would be lost if the strawberry is cut. In addition, the flow diagram shows that even after the cut/no cut decision 60 is made, there is a delay 62, 66, respectively, as the strawberry travels along the conveyor to the point of being either ejected 64, or cut 68.

Figure 6:
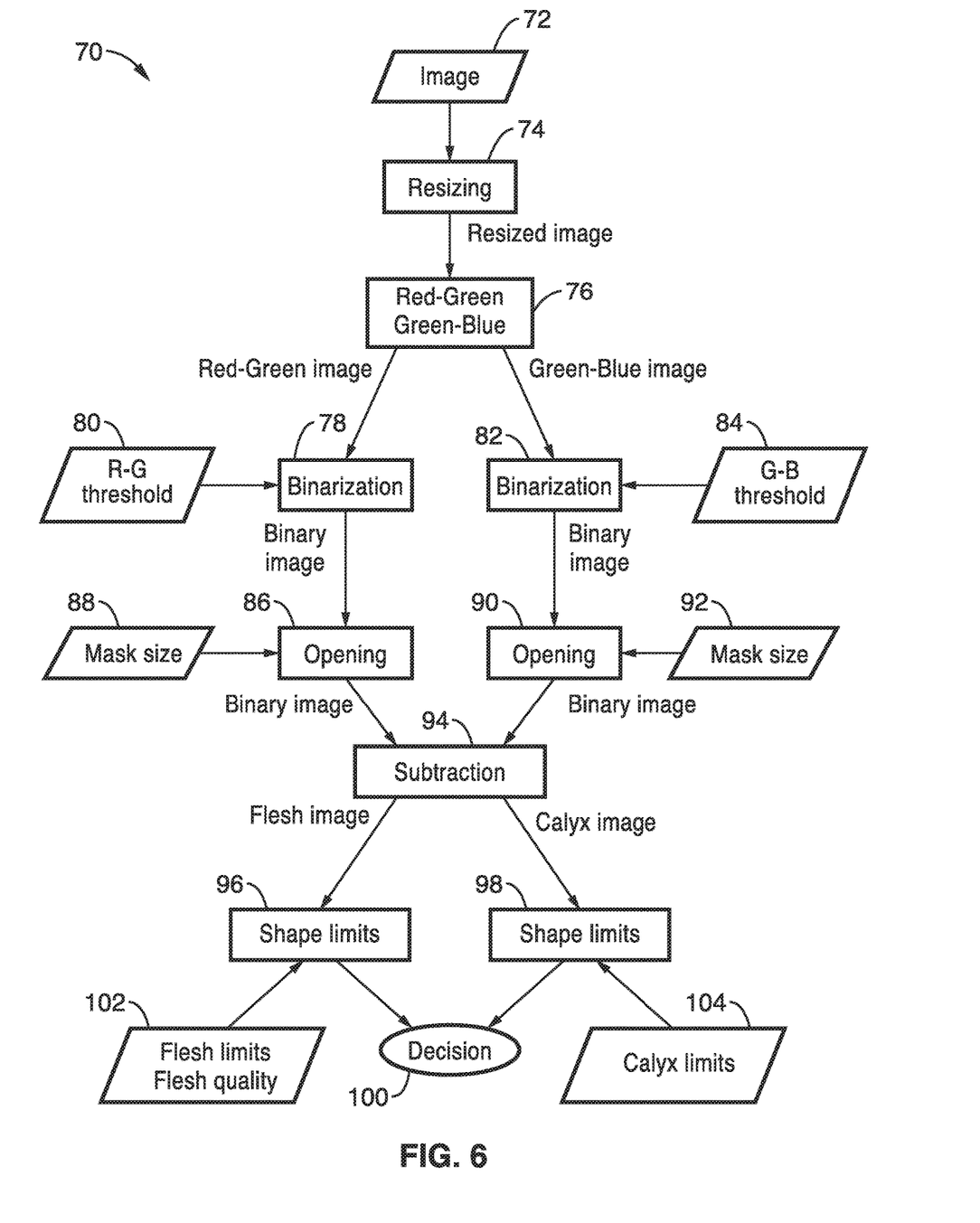
FIG. 6 is a flow diagram of image processing performed according to an embodiment of the present disclosure.

FIG. 6 illustrates an example embodiment 70 for image processing in the present disclosure. To optimize processing speed, the captured image 72 (or frame of video) is first resized 74 to eliminate non-essential portions of the image. The green calyx and the red strawberry flesh are digitally extracted by first generating 76 Red minus Green layers and Green minus Blue layers, wherein the processing flow splits into two paths. To actually extract the flesh and calyx images, a binarization is performed 78 and 82 respectively, based on thresholds. For example Red and Green thresholds 80 are used as input to step 78 for the red-green image, while Green and Blue thresholds 84 are used as input to step 82 for the green-blue image. Finally to remove the noise, an opening operation (morphological noise removal process known in image processing) 86, 90, is performed on these images, using mask size information 88, 92, respectively, followed by subtraction operation 94 to obtain separated images of the strawberry flesh and the calyx. Shape limits are then applied 96 to the image of the body portion of the strawberry based on flesh limits and quality information 102, and similar shape limits 98 are applied to the image of the calyx based on calyx limits 104. These shape limits are then used in making the decision 100 whether if the calyx can be cut from that particular strawberry.

Figure 7:
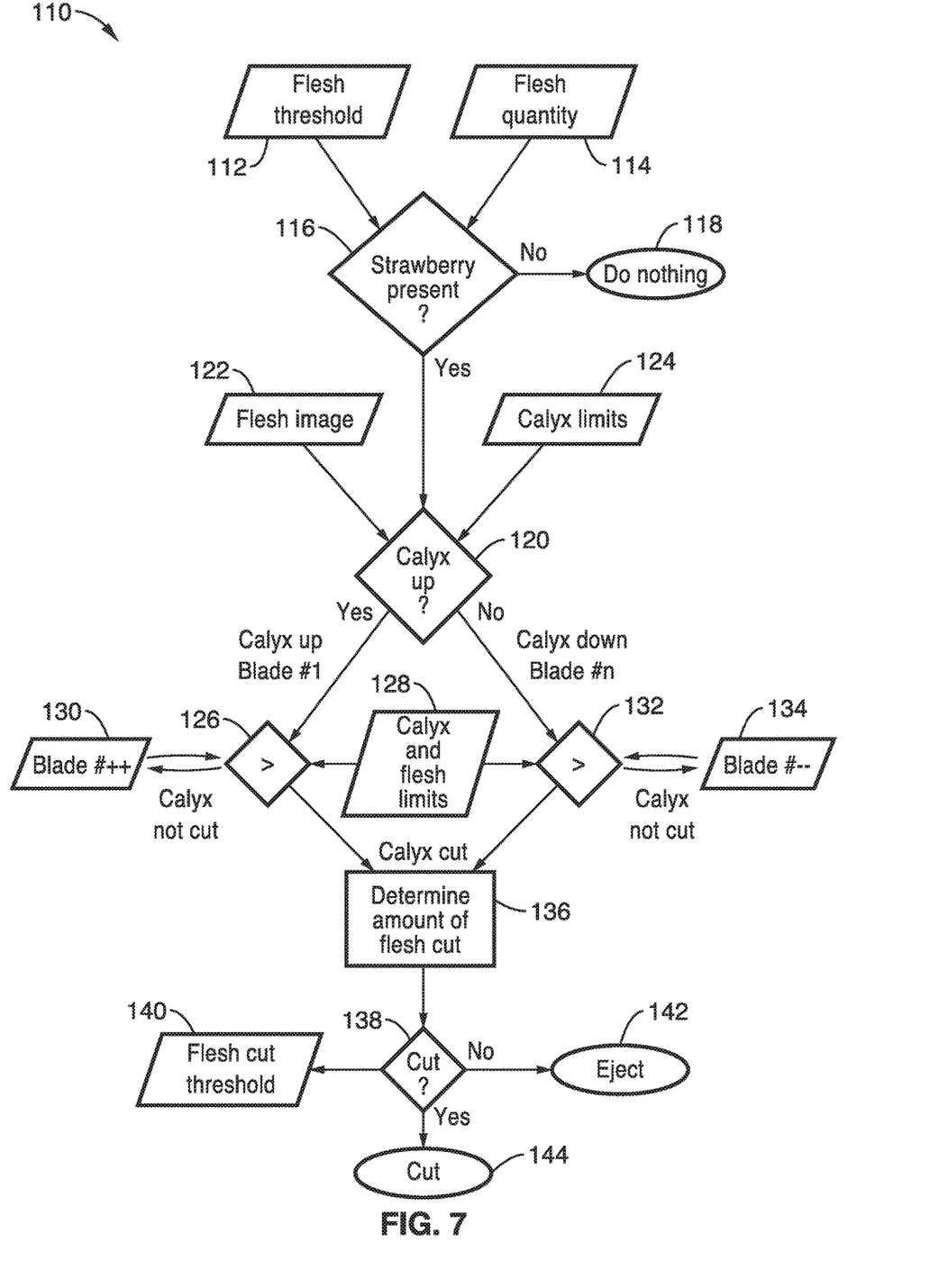
FIG. 7 is a flow diagram of cutting decision processing performed according to an embodiment of the present disclosure.

FIG. 7 illustrates an example embodiment 110 of decision processing for controlling the actions of the cutting head. A first decision 116 is based on whether a strawberry is even present between the rollers. Flesh threshold and quantity 112, 114, information is used in determining 116 if a strawberry is present. It should be noted that a strawberry may not be present due to a misfeed, slow feeding, or other condition for which case the cutting head does nothing 118.

If it is determined at step 116 that a strawberry is present, then execution moves to block 120, where the flesh image 122 and calyx limits 124 are utilized in deciding 120 if the Calyx is in the up position (which orientation on the rollers which may be referred to as up or down, right or left, etc.). In the following steps a particular blade is assigned to cut the calyx depending upon the orientation and location of the calyx. If Calyx is in the up position, then execution moves to decision step 126, or if in the down position then execution moves to decision step 132. In step 126 information 130 about calyx and flesh limits 128 and blade positions on a first portion of the cutter head is used to determine where the calyx would be cut, similarly in step 132 information on calyx and flesh limits 128 and blade positions 134 on a second portion of the cutter head (opposite end) are used. This information is then processed in step 136 to determine if the calyx could be cut and how much flesh of the strawberry would be lost in making the cut.

A cut decision is then made in step 138 based on a flesh cut threshold 140. If too much flesh would be lost then an eject decision is made flagged 142, otherwise a cut decision is reached 144. Thus the above makes a determination whether cutting the calyx will remove too much flesh, in which case the strawberry would be ejected. If the strawberry is in a proper cutting pose and an acceptable cut can be made, then the proper pneumatic cylinder is activated to move the correct blade when the roller pair reaches that blade.

4.1 Details of Alternate Embodiment of Process Control Steps

Figure 8:
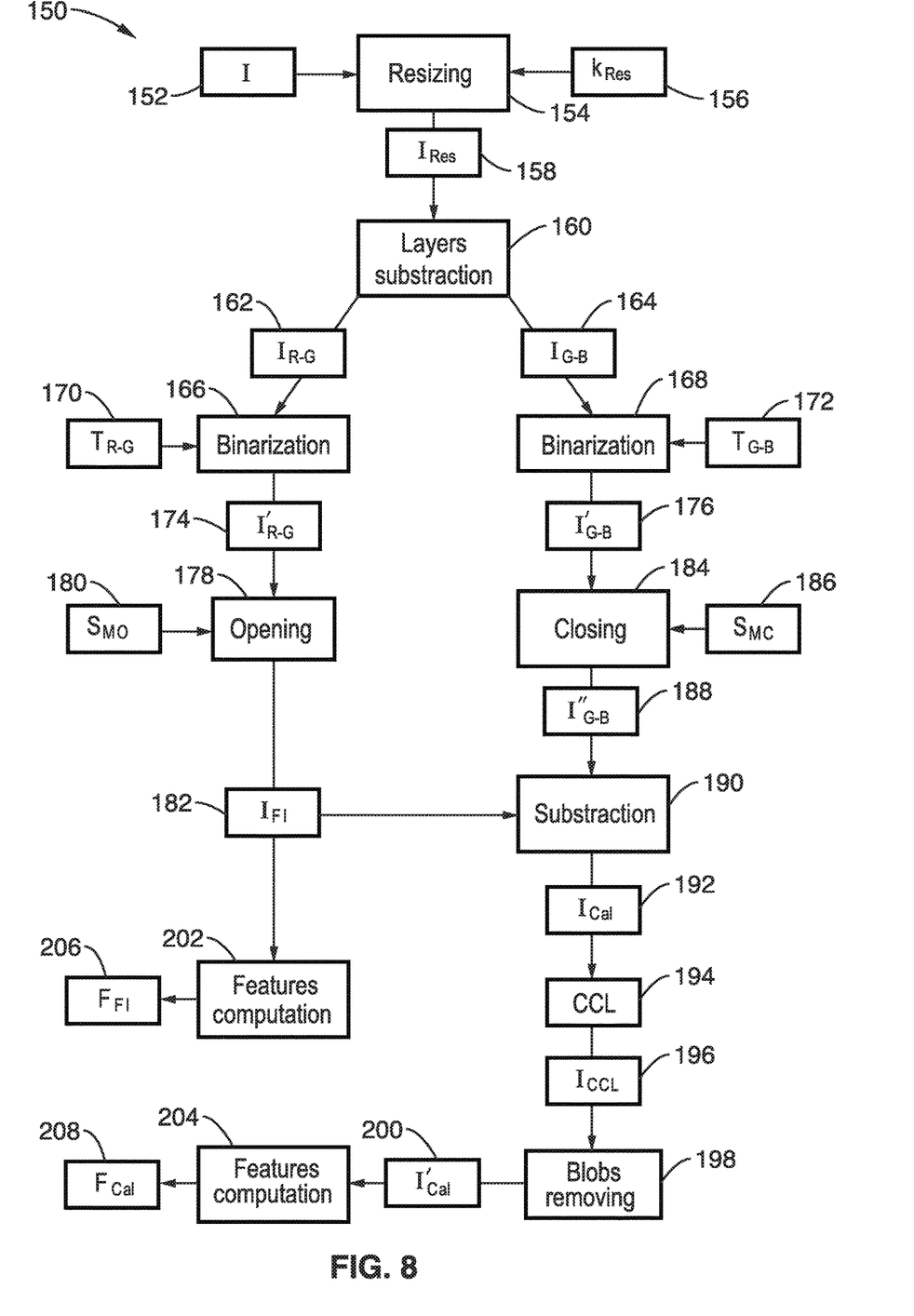
FIG. 8 is a flow diagram of image processing performed according to an alternate embodiment of the present disclosure.

FIG. 8 illustrates an example embodiment 150 for image processing in the present disclosure. To optimize processing speed, the captured image I 152 (or frame of video) is first resized 154 by reducing its dimension by a factor $k_{Res}$ 156, whereby a reduced sized image $I_{Res}$ 158 is obtained. In order to extract the green calyx and the red strawberry flesh, two new color spaces are generated. They are obtained by subtracting 160 the red and green layers of image $I_{Res}$ 158 for the first one, and the green and blue layers of image $I_{Res}$ 158 for the second one. Block $I_{R-G}$ 162 contains the flesh and some parts of the background whereas $I_{G-B}$ 164 contains the whole fruits and parts of the background as well. To remove the background from those images, a binarization is performed 166 and 168 respectively, based on thresholds $T_{R-G}$ 170 and $T_{G-B}$ 172. For example $T_{R-G}$ 170 is used as input to step 166 for the red-green image, while $T_{G-B}$ 172 is used as input to step 168 for the green-blue image. The binarization steps lead to binary images $I'_{R-G}$ 174 and $I'_{G-B}$ 176. To obtain the flesh from image $I'_{R-G}$ 174 the noise is removed by performing a morphological opening 178 (morphological erosion and dilation are successively applied) using a square kernel of size $S_{MO}$ 180. Thus a binary image of the flesh $I_{Ft}$ 182 is obtained. Concerning $I'_{G-B}$ 176, a morphological closing 184 (morphological dilation and erosion are successively applied) using a square kernel of size $S_{MC}$ 186. This step allows one to obtain a binary image $I''_{G-B}$ 188 of the whole fruit where the holes have been filled. Then image $I_{Ft}$ 182 is subtracted 190 from image $I''_{G-B}$ 188 to obtain an image $I_{Cal}$ 192 of the calyx with noise. To extract the calyx from the noise, a first step consists of identifying the connected areas, also named blobs, using a connected component labeling (CCL) method 194 to obtain an image $I_{CCL}$ 196 containing labeled blobs. The size and center of gravity of each blob are computed 198, with the blobs being saved or removed from the image based on those features. Thus, a binary image $I'_{Cal}$ 200 of the calyx is obtained. Finally $I_{Fl}$ 182 and $I'_{Cal}$ 200 are used to extract some features of the flesh 202 and the calyx 204, respectively named $F_{Fl}$ 206 and $F_{Cal}$ 208. The vector $F_{Fl}$ 206 contains the percentage $F_{Fl}$ of pixels representing the flesh in the image and the center of gravity $COG_{Fl}$ of the flesh. The vector $F_{Cal}$ 208 contains the percentage $P_{Cal}$ of pixels representing the calyx in the image, the center of gravity $COG_{Cal}$ of the calyx and the row values $R_{Cal}^{Max}$ and $R_{Cal}^{Min}$, respectively, representing the lower and upper limits of the calyx. Those features are then used in making the decision, whose flow is outlined in the next figure, as to whether the calyx can be cut from that particular strawberry, or whether it will be ejected and subject to further/other processing.

Figure 9:
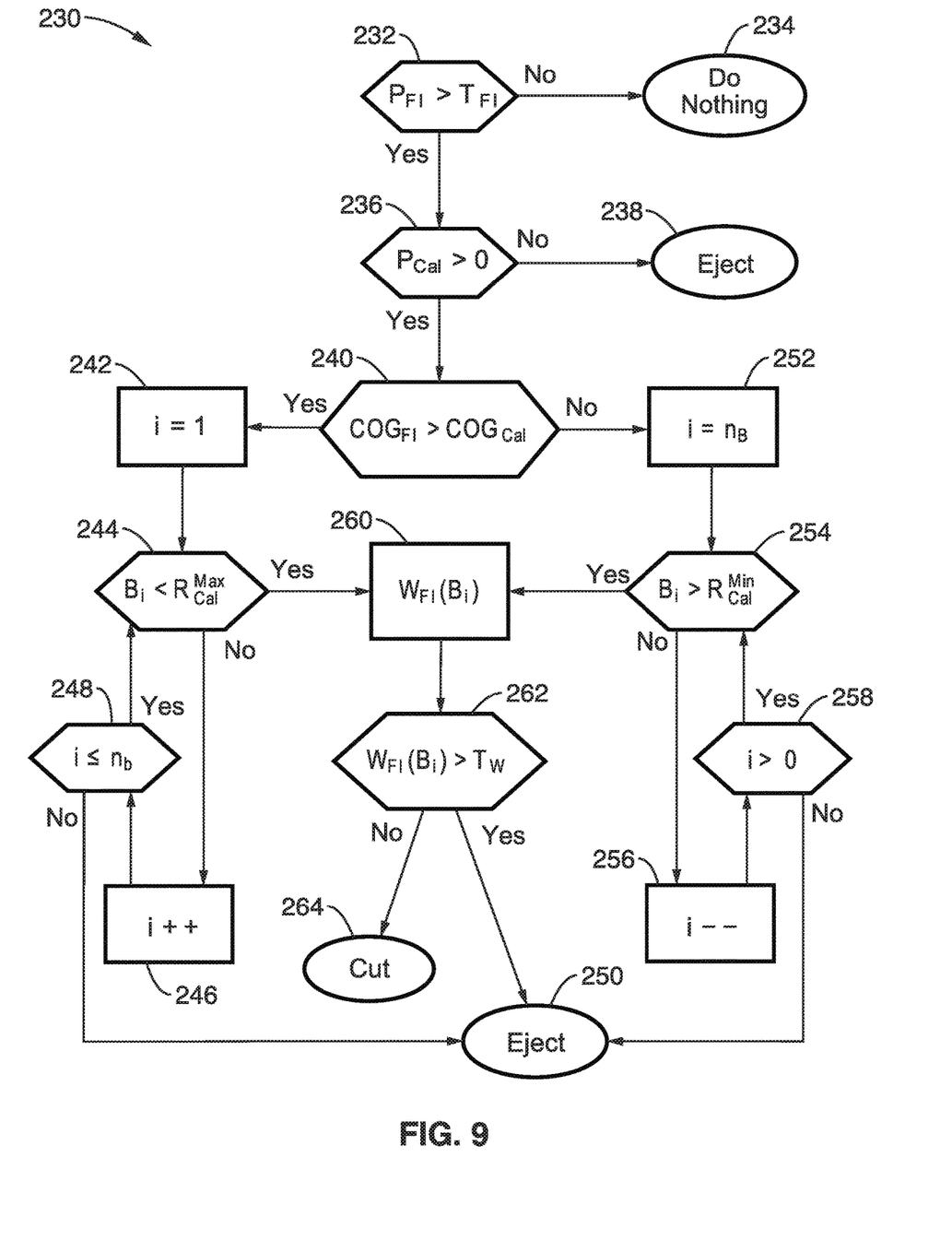
FIG. 9 is a flow diagram of cutting decision processing performed according to an alternate embodiment of the present disclosure.

FIG. 9 illustrates an example embodiment 230 of decision processing for controlling the actions of the cutting head. A first decision determines 232 whether a strawberry is even present between the rollers. Flesh percentage $P_{Fl}$ and threshold information $T_{Fl}$ are compared in block 232 determining if a strawberry is present. It should be noted that a strawberry may not be present due to a misfeed, slow feeding, or other condition, in which case the cutting head does nothing as per block 234.

If it is determined at step 232 that a strawberry is present, then execution moves to block 236, where the calyx percentage $P_{Cal}$ is used in determining if a calyx is present. It should be noted that a calyx may not be present in the image if the strawberry is not well oriented for which case the fruit is ejected 238.

If it is determined at step 236 that a strawberry and a calyx are present, then execution moves to block 240, where the centers of gravity of the flesh $COG_{Fl}$ and the calyx $COG_{Cal}$ are compared to determine if the Calyx is in the up position (which orientation on the rollers may be referred to as up or down, right or left, or other relative orientation description). If the calyx is in the up position, the first blade is considered 242 ($B_i$=1). Processing moves to block 244, where a decision is made if row $B_i$ (blade position), is greater than the lower limit of the calyx $R_{Cal}^{Max}$, in which this blade position is not used. The next blade position (incremented i) is considered 246. A check is made 248 if there are blade positions remaining, and if not, then processing proceeds to the eject decision 250. Otherwise, this next blade position is checked at block 244, with each blade position checked until either a suitable blade position is found, or it is decided to eject the strawberry.

It will be appreciated that a similar blade selection process takes place in the opposing strawberry orientation starting at the blade on the opposite end of the cutting head. In this case the sixth blade is first considered 254, which if not suitable, the blade position is decremented 256, and a check for last blade in that direction is made 258. The process similarly iterates until either a proper blade is found 260, or an eject decision 250 is made. Upon selecting a blade, in either orientation, block 262 is reached which determines the percentage of wasted flesh $W_{Fl}$ ($B_i$). If the calyx is in the up position, this percentage of wasted flesh is considered equal to the number of flesh pixels above the selected blade line, divided by the total number of flesh pixels. If the calyx is in the down position, it is equal to the number of flesh pixels under the selected blade line, divided by the total number of flesh pixels. Then if the percentage of wasted flesh is found in block 262 to be greater than the threshold $T_W$ then the fruit is ejected 250, which typically indicates the strawberry is not well oriented in the pocket. If the amount of prospective waste would be less than the threshold, then the decision is made to cut 264 the current strawberry with the selected blade.

5. Additional Implementation Details

The presented technology can be readily implemented using the described hardware elements and industrial computers, programmable logic controllers, or similar for controlling the processing steps. It should also be appreciated that factory automation equipment is typically implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, computer processor, central processing unit (CPU), and computer are used synonymously to denote a device capable of executing the instructions and communicating with input/output interfaces and/or peripheral devices, and that the terms processor, computer processor, CPU, and computer are intended to encompass single or multiple devices, single core and multicore devices, and variations thereof.

From the description herein, it will be appreciated that that the present disclosure encompasses multiple embodiments which include, but are not limited to, the following:

1. An automated produce capping apparatus, comprising: (a) a conveyor having a plurality of rollers in at least one row along the length of said conveyor; (b) said plurality of rollers each having a concave-shaped slotted section and a long axis, (c) wherein said rollers are configured to rotate toward forcing a produce item retained between adjacent rollers so that its long axis becomes parallel to the long axis of the rollers; (d) an imaging device, positioned proximal to said conveyor, wherein said imaging device is configured to image the produce item on said conveyor; (e) a cutting head having one or more blades which can be actuated to extend through the produce item and into a slot in said concave-shaped slotted section of one or more of said plurality of rollers, thus separating a cap of the produce item from its main fleshy portion; (f) a computer processor; and (g) a memory storing instructions executable by the computer processor, said instructions when executed performing steps comprising: (g)(i) acquiring an image, from said imaging device, of the produce item as it travels along said conveyor; (g)(ii) image processing of the image to locate a stemmed end of the produce item, and if the produce item is in a proper position and orientation for being cut, then an optimal cutting plane is determined; and (g)(iii) activating said cutting head for making that cut as the produce item reaches said cutting head to thus cap the produce.

2. The apparatus of any preceding embodiment, wherein said produce comprises strawberries.

3. The apparatus of any preceding embodiment, further comprising a feed chute and/or singulator configured for directing single produce items onto the rollers of said conveyor.

4. The apparatus of any preceding embodiment, wherein said apparatus performs produce orientation and cutting along the same conveyor line.

5. The apparatus of any preceding embodiment, further comprising a friction pad retained beneath said rollers along a portion of said conveyor, wherein said friction pad is configured for applying a friction force to the exterior of passing rollers forcing them into rotation.

6. The apparatus of any preceding embodiment, further comprising cylindrical protrusions extending from the ends of each roller which are configured for engaging said friction pad to force the roller into rotation.

7. The apparatus of any preceding embodiment, further comprising flats on portions of each roller which are configured for engaging a set of tracks so that the roller is maintained in a specific orientation during a portion of its travel on said conveyor in which the cutting operation is performed.

8. The apparatus of any preceding embodiment, wherein said roller is configured with either an axial or non-axial spine.

9. The apparatus of any preceding embodiment, wherein said cutting head is configured with multiple cutting blades, each of which is aligned with a specific slot in the rollers to make an individual cut through the produce without striking the rollers.

10. The apparatus of any preceding embodiment, further comprising a produce item diverter configured for diverting or ejecting uncapped produce items so that they do not exit the conveyor with the capped produce items.

11. The apparatus of any preceding embodiment, wherein said diverter is configured at the end of the conveyor for separating produce items which have not been capped, from produce items which have been capped.

12. The apparatus of any preceding embodiment, wherein said instructions stored in the memory and executable on the processor are further configured for performing the steps comprising: determining that an item of produce is not in a proper cutting pose, then not actuating a cutting operation when the produce item reaches the cutting head, followed by activating the produce diverter to separate the uncut produce item from capped produce items traveling along the conveyor or exiting the end of the conveyor.

13. The apparatus of any preceding embodiment, wherein said instructions stored in the memory and executable on the processor are further configured for processing images received from said imaging device by performing steps comprising: (i) separating the image into red-green and blue-green images; (ii) binarizing the red-green image based on a red-green threshold; (iii) binarizing the blue-green image based on a blue-green threshold; (iv) performing morphological noise removal in an opening operation on the red-green and blue-green images based on mask size; (v) performing a subtraction to provide a separate flesh image and cap (calyx) image; (vi) applying shape limits to the separate flesh image and cap image; and (vii) determining whether to cap the produce item based on shape limits for the flesh image and cap image.

14. The apparatus of any preceding embodiment, wherein said instructions stored in the memory and executable on the processor are further configured for controlling the activation of said cutting head after determining that a produce item is present and that making that cut would not result in too much loss of the produce item, after which a cutting blade, or cutting blade position, is selected based on capping limits for the produce item.

15. The apparatus of any preceding embodiment, further comprising a separation grate extending from a produce exit end of said conveyor, said separation grate having a plurality of slots which are sufficiently narrow to allow the cut caps of the produce to fall through, while the body of each item of produce is directed over the top of the grate.

16. A strawberry capping apparatus, comprising: (a) a conveyor with a plurality of rollers in at least one row along the length of said conveyor; (b) said plurality of rollers each having a concave-shaped slotted section and a long axis, said rollers configured to orient a strawberry placed thereon such that a long axis of the strawberry becomes parallel to the long axis of the roller in response to sufficient rotation of said rollers; (c) a camera positioned above said conveyor, said camera configured to image a strawberry nestled between a pair of rollers as it passes by the camera; (d) a cutting head, said cutting head having a plurality of individually selectable blades, each blade assigned to a roller slot position; (e) a computer processor; and (f) a memory storing instructions executable by the computer processor, said instructions when executed performing steps comprising: (f)(i) acquiring an image of the strawberry from the camera; (f)(ii) locating calyx of the strawberry and determining if the strawberry is in a proper pose to be cut; (f)(iii) if the strawberry is in a proper pose to be cut: (f)(iii)(1) determining an optimal cutting plane to remove the calyx with minimal loss of fruit flesh; (f)(iii)(2) determining which slot on the rollers is closest to the optimal cutting plane; and (f)(iii)(3) activating an appropriate blade, from said plurality of individually selectable blades, and cutting the calyx of the strawberry as it passes beneath the cutting head.

17. The apparatus of any preceding embodiment, further comprising a separation grate configured for separating cut strawberry and cut cap with the calyx.

18. The apparatus of any preceding embodiment, further comprising: (a) a diverter device; and (b) instructions stored in the memory and executable on the processor, wherein said instructions when executed perform steps comprising activating said diverter to bypass the cutting head and divert the strawberry away from said separation grate and to a chute or conveyor if the strawberry is not in a good cutting pose.

19. The apparatus of any preceding embodiment, further comprising a feed chute and/or singulator configured for directing single strawberries onto the rollers of said conveyor.

20. The apparatus as recited in claim 16, wherein said cutting head is configured with multiple cutting blades, each of which is aligned with a specific slot in the rollers to make an individual cut through the strawberry without striking the rollers.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An automated produce capping apparatus, comprising:
   (a) a conveyor having a plurality of rollers in at least one row along the length of said conveyor;
   (b) said plurality of rollers each having a concave-shaped slotted section and a long axis,
   (c) wherein said rollers are configured to rotate toward forcing a produce item retained between adjacent rollers so that its long axis becomes parallel to the long axis of the rollers;
   (d) an imaging device, positioned proximal to said conveyor, wherein said imaging device is configured to image the produce item on said conveyor;
   (e) a cutting head having one or more blades which can be actuated to extend through the produce item and into a slot in said concave-shaped slotted section of one or more of said plurality of rollers, thus separating a cap of the produce item from its main fleshy portion;
   (f) a computer processor;
   (g) a memory storing instructions executable by the computer processor, said instructions when executed performing steps comprising:
      (i) acquiring an image, from said imaging device, of the produce item as it travels along said conveyor;
      (ii) image processing of the image to locate a stemmed end of the produce item, and if the produce item is in a proper position and orientation for being cut, then an optimal cutting plane is determined; and
      (iii) activating said cutting head for making that cut as the produce item reaches said cutting head to thus cap the produce item; and
   (h) a friction pad retained beneath said rollers along a portion of said conveyor, wherein said friction pad is configured for applying a friction force to the exterior of passing rollers forcing them into rotation.

2. The apparatus as recited in claim 1, wherein said produce item comprises strawberries.

3. The apparatus as recited in claim 1, further comprising a feed chute and/or singulator configured for directing single produce items onto the rollers of said conveyor.

4. The apparatus as recited in claim 1, wherein said apparatus performs produce orientation and cutting along the same conveyor line.

5. The apparatus as recited in claim 1, further comprising cylindrical protrusions extending from the ends of each roller which are configured for engaging said friction pad to force the roller into rotation.

6. The apparatus as recited in claim 1, further comprising flats on portions of each roller which are configured for engaging a set of tracks so that the roller is maintained in a specific orientation during a portion of its travel on said conveyor in which a cutting operation is performed.

7. The apparatus as recited in claim 1, wherein said roller is configured with either an axial or non-axial spine.

8. The apparatus as recited in claim 1, wherein said cutting head is configured with multiple cutting blades, each of which is aligned with a specific slot in the rollers to make an individual cut through the produce without striking the rollers.

9. The apparatus as recited in claim 1, further comprising a produce item diverter configured for diverting or ejecting uncapped produce items so that they do not exit the conveyor with the capped produce items.

10. The apparatus as recited in claim 9, wherein said diverter is configured at the end of the conveyor for separating produce items which have not been capped, from produce items which have been capped.

11. The apparatus as recited in claim 9, wherein said instructions stored in the memory and executable on the processor are further configured for performing the steps comprising: determining that an item of produce is not in a proper cutting pose, then not actuating a cutting operation when the produce item reaches the cutting head, followed by activating the produce diverter to separate the uncut produce item from capped produce items traveling along the conveyor or exiting the end of the conveyor.

12. An automated produce capping apparatus, comprising:
(a) a conveyor having a plurality of rollers in at least one row along the length of said conveyor;
(b) said plurality of rollers each having a concave-shaped slotted section and a long axis,
(c) wherein said rollers are configured to rotate toward forcing a produce item retained between adjacent rollers so that its long axis becomes parallel to the long axis of the rollers;
(d) an imaging device, positioned proximal to said conveyor, wherein said imaging device is configured to image the produce item on said conveyor;
(e) a cutting head having one or more blades which can be actuated to extend through the produce item and into a slot in said concave-shaped slotted section of one or more of said plurality of rollers, thus separating a cap of the produce item from its main fleshy portion;
(f) a computer processor; and
(g) a memory storing instructions executable by the computer processor, said instructions when executed performing steps comprising:
(i) acquiring an image, from said imaging device, of the produce item as it travels along said conveyor;
(ii) image processing of the image to locate a stemmed end of the produce item, and if the produce item is in a proper position and orientation for being cut, then an optimal cutting plane is determined; and
(iii) activating said cutting head for making that cut as the produce item reaches said cutting head to thus cap the produce item;
(h) wherein said instructions stored in the memory and executable on the processor are further configured for processing images received from said imaging device by performing steps comprising:
(i) separating the image into red-green and blue-green images;
(ii) binarizing the red-green image based on a red-green threshold;
(iii) binarizing the blue-green image based on a blue-green threshold;
(iv) performing morphological noise removal in an opening operation on the red-green and blue-green images based on mask size;
(v) performing a subtraction to provide a separate flesh image and cap (calyx) image;
(vi) applying shape limits to the separate flesh image and cap image; and
(vii) determining whether to cap the produce item based on shape limits for the flesh image and cap image.

13. The apparatus as recited in claim 1, wherein said instructions stored in the memory and executable on the processor are further configured for controlling the activation of said cutting head after determining that a produce item is present and that making that cut would not result in too much loss of the produce item, after which a cutting blade, or cutting blade position, is selected based on capping limits for the produce item.

14. The apparatus as recited in claim 1, further comprising a separation grate extending from a produce exit end of said conveyor, said separation grate having a plurality of slots which are sufficiently narrow to allow the cut caps of the produce to fall through, while the body of each item of produce is directed over the top of the grate.

* * * * *